United States Patent
Wang et al.

(10) Patent No.: US 11,590,601 B2
(45) Date of Patent: Feb. 28, 2023

(54) METHOD OF JOINING STEEL WORK-PIECES HAVING DIFFERENT GAUGE RATIOS

(71) Applicant: GM GLOBAL TECHNOLOGY OPERATIONS LLC, Detroit, MI (US)

(72) Inventors: Pei-chung Wang, Troy, MI (US); Michael J. Karagoulis, Okemos, MI (US); Spyros P. Mellas, Waterford, MI (US); Steven Cipriano, Chesterfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 545 days.

(21) Appl. No.: 16/576,938

(22) Filed: Sep. 20, 2019

(65) Prior Publication Data

US 2021/0086287 A1 Mar. 25, 2021

(51) Int. Cl.
*B23K 11/20* (2006.01)
*B23K 11/30* (2006.01)
(Continued)

(52) U.S. Cl.
CPC .............. *B23K 11/20* (2013.01); *B23K 11/30* (2013.01); *B23K 11/115* (2013.01);
(Continued)

(58) Field of Classification Search
CPC ... B23K 11/0066; B23K 11/115; B23K 11/16; B23K 11/20; B23K 11/30; B23K 11/34;
(Continued)

(56) References Cited

U.S. PATENT DOCUMENTS

| 4,514,612 A | 4/1985 | Nied et al. |
| 5,302,797 A | 4/1994 | Yasuyama et al. |

(Continued)

FOREIGN PATENT DOCUMENTS

| CN | 101234453 A | 8/2003 |
| CN | 107073555 A | 8/2017 |

(Continued)

OTHER PUBLICATIONS

U.S. Appl. No. 15/952,645, titled "Resistance Spot Brazing Workpiece Stack-Ups Having One or More Thin-Gauge Steel Workpieces," filed Apr. 13, 2018 by GM Global Technology Operations LLC.

(Continued)

*Primary Examiner* — Ibrahime A Abraham
*Assistant Examiner* — Joseph W Iskra
(74) *Attorney, Agent, or Firm* — Vivacqua Crane PLLC (57) ABSTRACT

A method of joining a multiple member work-piece includes providing a first steel work-piece having a first thickness and a second steel work-piece having a second thickness. The first thickness is at least twice the second thickness. A third material is disposed in contact with the second steel work-piece. For example, the third material may be in the form of a rivet, a plurality of pins, or a coating material. The method includes resistance welding the first and second work-pieces together. A bonded assembly includes the first and second steel members and the third material being bonded together, where the thickness of the first member is at least twice the thickness of the second member.

6 Claims, 6 Drawing Sheets

(51) Int. Cl.
　　　*B23K 103/04*　　(2006.01)
　　　*F16B 19/06*　　(2006.01)
　　　*F16B 37/06*　　(2006.01)
　　　*B23K 11/11*　　(2006.01)

(52) U.S. Cl.
　　　CPC ........... *B23K 2103/04* (2018.08); *F16B 19/06* (2013.01); *F16B 37/061* (2013.01)

(58) Field of Classification Search
　　　CPC .............. B23K 2101/18; B23K 2103/04; C09J 2400/163; C09J 5/10; F16B 19/06; F16B 37/061; F16B 5/08
　　　USPC ........................................................ 219/118
　　　See application file for complete search history.

(56) References Cited

U.S. PATENT DOCUMENTS

| | | | |
|---|---|---|---|
| 6,107,595 | A | 8/2000 | Peterson |
| 8,250,728 | B2 | 8/2012 | Stevenson et al. |
| 9,737,956 | B2 | 8/2017 | Yang et al. |
| 10,052,710 | B2 | 8/2018 | Sigler et al. |
| 10,632,560 | B2* | 4/2020 | Pedersen ................... F16B 5/08 |
| 2014/0124485 | A1 | 5/2014 | Tseng et al. |
| 2014/0367368 | A1 | 12/2014 | Yang et al. |
| 2015/0044450 | A1 | 2/2015 | Yuasa et al. |
| 2015/0174690 | A1 | 6/2015 | Furusako et al. |
| 2015/0357621 | A1 | 12/2015 | Hardy et al. |
| 2016/0136752 | A1 | 5/2016 | Aoyama |
| 2017/0297135 | A1 | 10/2017 | Sigler et al. |
| 2017/0316556 | A1 | 11/2017 | Spinella et al. |
| 2017/0349220 | A1 | 12/2017 | Yamada et al. |
| 2019/0224773 | A1* | 7/2019 | Radomski .......... B23K 11/0066 |
| 2019/0363328 | A1* | 11/2019 | Wang ................... B23K 11/312 |

FOREIGN PATENT DOCUMENTS

| | | |
|---|---|---|
| JP | 2010207898 | 9/2010 |
| JP | 2017100148 A | 6/2017 |

OTHER PUBLICATIONS

U.S. Appl. No. 16/034,712, titled "Pretreatment of Weld Flanges to Mitigate Liquid Metal Embrittlement Cracking in Resistance Welding of Galvanized Steels," filed Jul. 13, 2018 by GM Global Technology Operations LLC.

U.S. Appl. No. 16/561,305, titled "Method of Joining Steel Having Different Resistivities," filed Sep. 5, 2019 by GM Global Technology Operations LLC.

* cited by examiner

METHOD OF JOINING STEEL WORK-PIECES HAVING DIFFERENT GAUGE RATIOS

TECHNICAL FIELD

This disclosure relates to joining steel members that have different gauge ratios, and an assembly including the joined members.

INTRODUCTION

Resistance welding has been a common and successful process for joining steel work-pieces together. Resistance welding has largely been successful because the materials being joined generally had similar thicknesses to one another. However, when attempting to resistance weld steel work-pieces together that have large differences in thickness, or gauge, the result has been a lack of weld penetration into the thinner steel work-piece. For example, typically, when one of the steel work-pieces is at least twice as thick as the other steel work-piece, the weld penetration has been inadequate, and the weld joint easily breaks apart.

SUMMARY

The present disclosure provides a method for joining steel work-pieces together that have different thicknesses, or gauges, and a resultant joined assembly. A third material, which may be in the form of a rivet, a plurality of pins, or a coating, by way of example, is used to concentrate the welding heat into the thinner steel work-piece, which results in balanced weld penetration and a good weld joint.

In one form, which may be combined with or separate from the other forms described herein, a method of joining a multiple member work-piece is provided. The method includes providing a first steel work-piece having a first thickness and providing a second steel work-piece having a second thickness, where the first thickness is at least twice the second thickness. The method includes disposing a third material in contact with the second steel work-piece. The method further includes resistance welding the first and second steel work-pieces and the third material together.

In another form, which may be combined with or separate from the other forms disclosed herein, a bonded assembly includes a first member formed of a first steel material having a first thickness and a second member formed of a second steel material having a second thickness. The first thickness is at least twice the second thickness. A third material is disposed in contact with the second member. The first and second members and the third material are bonded together.

Additional optional features may be provided, including but not limited to the following: the first thickness being at least three times or at least four times the second thickness; the first and second steel work-pieces being formed of the same material; and/or the first and second steel work-pieces being formed of different materials.

In some examples, the third material is provided in the form of a rivet that may be pierced into the second steel work-piece. The rivet may be inserted only partially into the second work-piece or completely through the second work-piece and pierced into the first work-piece. The rivet has a head disposed on an outer side of the second work-piece, and the rivet may have a shank inserted into/through the second member. The rivet and a die may be used to create a bulge extending from the second work-piece at a faying interface between the first and second work-pieces. Resistance welding is performed by pressing a first electrode against the head of the rivet and a second electrode against an outer side of the first work-piece and passing a current between the first and second electrodes, through the first and second work-pieces, and through the rivet. The resultant bonded assembly includes the head of the rivet being bonded to the second member. The head of the rivet may have a thickness in the range of less than twice the thickness of the second member and greater than one-fifth the thickness of the second member.

In other examples, the third material may be provided in the form of a plurality of pins disposed in contact with both the first and second work-pieces. In such cases, the method may include adding the plurality of pins to the first work-piece using a cold metal transfer arc welding process.

In yet other examples, the third material may be provided in the form of a coating, such as a thermal spray coating, disposed between the first and second work-pieces or members. The third material may be, for example, nickel, an aluminum silicon alloy, a steel alloy, an adhesive material, or a combination thereof.

The above features and advantages and other features and advantages are readily apparent from the following detailed description when taken in connection with the accompanying drawings.

BRIEF DESCRIPTION OF THE DRAWINGS

The drawings are provided for illustration purposes only and are not intended to limit the scope of the application or the claims.

DESCRIPTION

Figure 1:
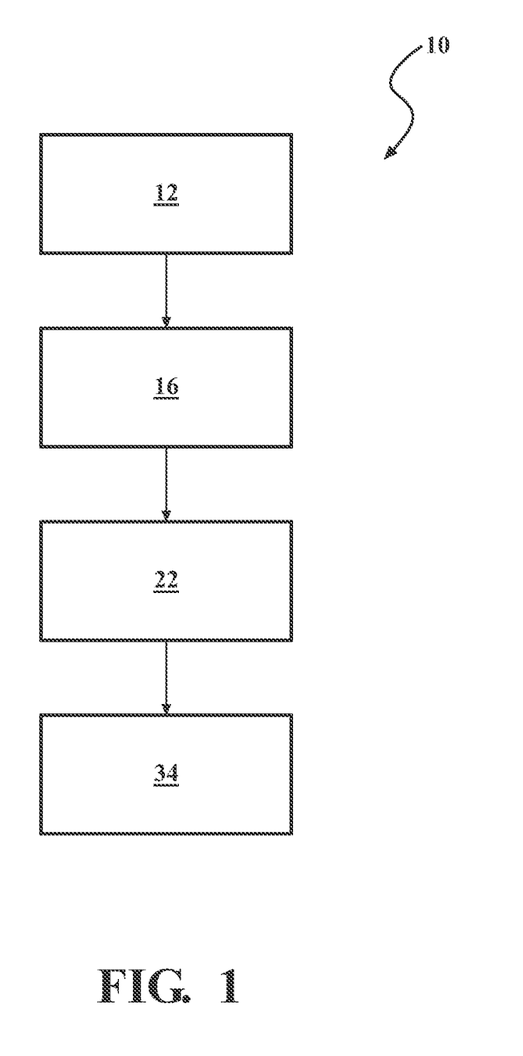
FIG. 1 is a block diagram illustrating a method of joining a multiple work-piece stack-up, according to the principles of the present disclosure.

Referring to the drawings, wherein like reference numbers refer to like components, FIG. 1 is a block diagram illustrating, at a high level, a method 10 for joining a multiple member work-piece. Referring to FIGS. 2A-2D, along with FIG. 1, the method 10 includes a step 12 of providing a first steel work-piece 14 having a first thickness $t_1$ and a step 16 of providing a second steel work-piece 18 having a second thickness $t_2$. As shown in FIG. 2C, the first and second work-pieces 14, 18 are provided in a stack-up 20 in a resistance welding operation, with the second work-piece 18 being disposed on the first work-piece 14.

The thicknesses $t_1$, $t_2$ of each of the respective work-pieces 14, 18 are different from one another, with the thickness $t_1$ of the first work-piece 14 being much greater than then thickness $t_2$ of the second work-piece 18. For example, the first work-piece 14 is at least twice as thick as the second work-piece 18, such that $t_1 \geq 2*t_2$. In some examples, $t_1$ is at least three times $t_2$, and in some examples, $t_1$ is even at least four times $t_2$.

As explained above, work-pieces in a stack-up with substantial differences in thickness would typically not form a good bond to one another in a resistance spot welding operation because a weld nugget would not normally penetrate well into the thinner work-piece, due to the fact that heat would be concentrated in the thicker work-piece. To provide for a well-penetrated weld joint, the method 10 includes a step 22 of disposing a third material in contact with the thinner steel work-piece 18.

In the example of FIGS. 2A-2D, the third material is provided as an insert or rivet 24 that is inserted into the second steel work-piece 18. In the illustrated example, the rivet 24 has a head 36 and a shank 40. In this example, the diameter D of the head 36 is more than twice the diameter E of the shank 40, but other head diameters could alternatively be used without falling beyond the spirit and scope of the present disclosure. Furthermore, the head 36 has a thickness $t_3$ that is preferably in the range of less than twice the thickness $t_2$ of the second work-piece 18 and greater than one-fifth the thickness $t_2$ of the second work-piece 18. Thus, e.g., $2 > t_3/t_2 > 0.2$.

Figure 2A:
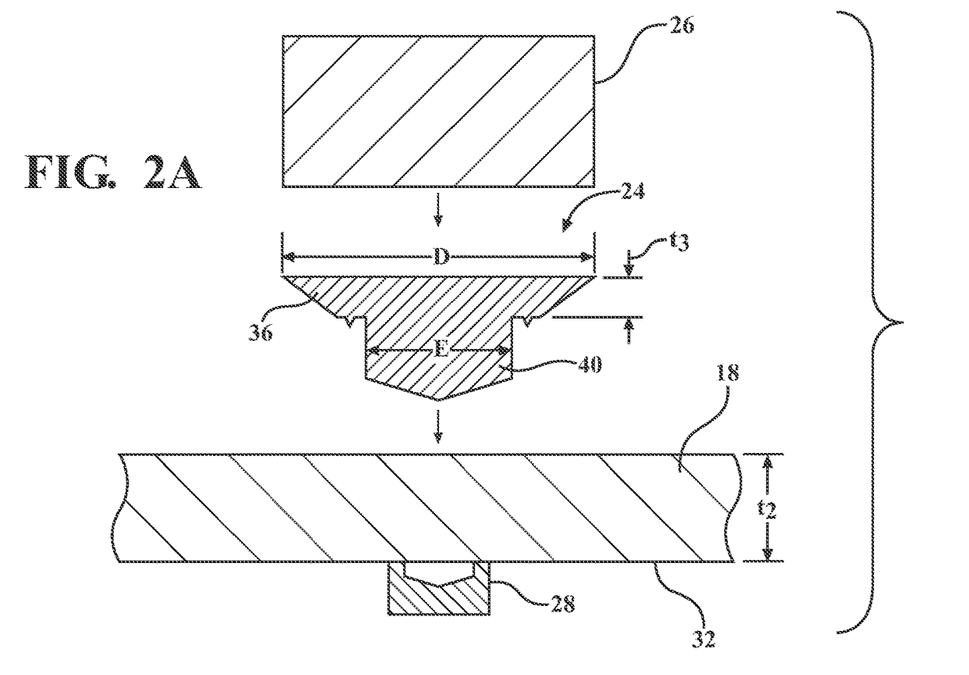
FIG. 2A is a schematic cross-sectional view of a work-piece and a punch and die for creating a projection or bulge in the work-piece, according to the principles of the present disclosure.
Figure 2B:
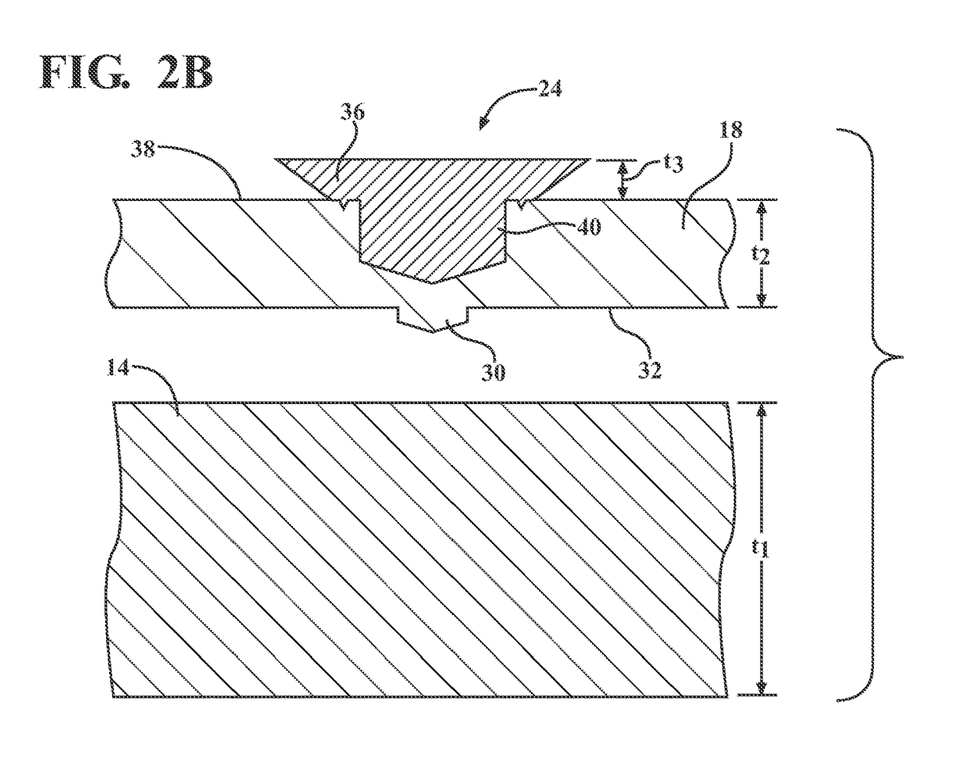
FIG. 2B is a schematic cross-sectional view of the work-piece of FIG. 2A, having a bulge extending therefrom and a rivet inserted into the work-piece, along with another work-piece, in accordance with the principles of the present disclosure.
Figure 2C:
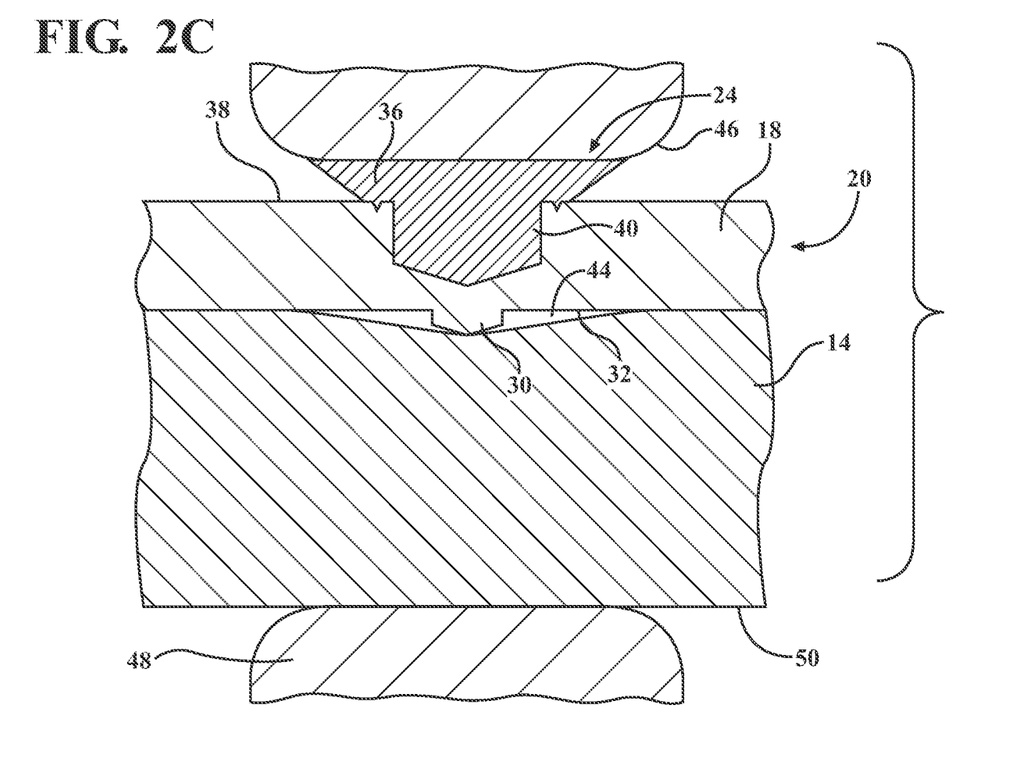
FIG. 2C is a schematic cross-sectional view of a multiple work-piece stack-up including the work-pieces and the rivet shown in FIG. 2B, having a pair of electrodes disposed on each side of the stack-up, according to the principles of the present disclosure.

Referring to FIGS. 2A-2B, a punch 26 and die 28 are used, along with the rivet 24, to form a bulge 30 or other extension that extends from a faying side 32 of the second work-piece 18. The head 36 of the rivet 24 is disposed on an outer side 38 of the second work-piece 18 and the shank 40 is pierced or inserted into the second work-piece 18. The rivet 24 could be a self-piercing rivet or another type of insert or rivet. Thus, the bulge 30 extends from the second work-piece 18 at a faying interface 44 between the first and second work-pieces 14, 18.

Referring now to FIG. 2C, and with continued reference to FIG. 1, the method 10 further includes a step 34 of resistance welding the first and second work-pieces 14, 18 and the rivet 24 together. In the example of FIG. 2C, the resistance welding operation is a resistance spot welding operation that is performed by pressing a first electrode 46 against the head 36 of the rivet 24 and a second electrode 48 against an outer side 50 of the first work-piece 14. A current is passed between the first and second electrodes 46, 48 through the first and second work-pieces 14, 18 and through the rivet 24. As the current is passed through the rivet shank 40 and the bulge 30 of the second work-piece 18, joule heat generation is enhanced at the faying interface 44 between the first and second work-pieces 14, 18, which improves the weld penetration into second steel work-piece 18 (that is, into the thinner of the work-pieces 14, 18).

Figure 2D:
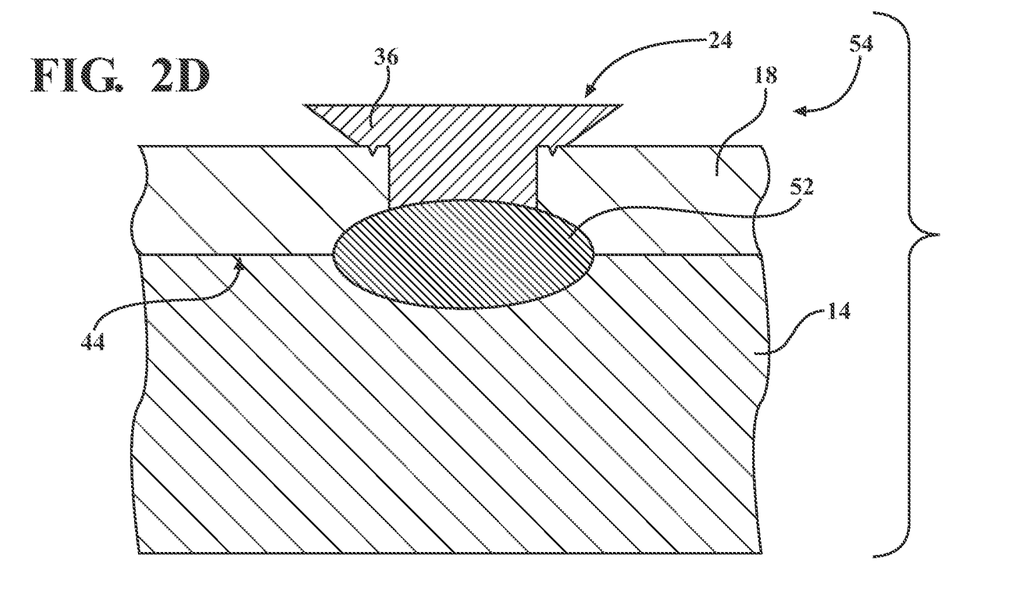
FIG. 2D is a schematic cross-sectional view of a bonded assembly formed by joining the stack-up of FIG. 2C, in accordance with the principles of the present disclosure.

Referring now to FIG. 2D, a balanced weld nugget 52 is therefore formed at the faying interface 44 of the steel work-pieces 14, 18, where the weld nugget 52 penetrates well into both of the work-pieces 14, 18 and penetrates the rivet 24. For example, the weld nugget 52 may penetrate into each work-piece 14, 18 by 25-75% of the total mass of the weld nugget 52. Thus, FIG. 2C illustrates a bonded assembly 54 that includes the first member 14, the second member 18, and the third material (which is the rivet 24) bonded together through the weld nugget 52.

The first and second work-pieces or members 14, 18 may be formed of the same steel material or different steel materials. For example, the work-pieces 14, 18 may be formed of steel materials such as second-generation high-strength (GEN 2) steels (austenitic stainless steels), third-generation advanced high-strength (GEN 3) steels, transformation-induced plasticity (TRIP) steels, twinning-induced plasticity (TWIP) steels, boron steel alloys (such as PHS 1300), interstitial free (IF) steels or other mild steels, high-strength low alloy steels (such as 340HSLA), dual-phase steels (such as DP590), martensitic steels (such as MS1500), multi-phase steels (such as MP1180 or MP980, or dual-phase steels (such as DP980, DP780, or DP590).

Referring now to FIGS. 3A-3D, another example of an application of the method 10 of FIG. 1 is illustrated. In this example, a different type of rivet 124 is disposed through the second work-piece 118 and into the first work-piece 114 in a work-piece stack-up 120. The rivet 124 is a blind rivet having a mandrel 56 disposed through a shank 140. The rivet 124 has a head 136 disposed on an outer side 138 of the second work-piece 118. The shank 140 and mandrel 56 are pierced or otherwise disposed completely through the second work-piece 118 and in contact with the first work-piece 114. For example, the rivet 124 may be friction stir driven through (with or without assist-heating) the second work-piece 118 without pre-drilling the second work-piece 118, or the rivet 124 may be inserted through a pre-drilled hole in the second work-piece 118. In some variations, the rivet 124 may be upset after being inserted through the second work-piece 118 to create a projection 58, and part of the mandrel 56, such as a top portion, may be removed (if desired).

All other details of the description and figures regarding the work-piece stack-up 20 of FIGS. 2A-2D may apply to FIGS. 3A-3D. For example, the thicknesses $t_1'$, $t_2'$ of the first and second work-pieces 114, 118 vary substantially. Thus, the thicknesses $t_1'$, $t_2'$ of each of the respective work-pieces 114, 118 are different from one another, with the thickness $t_1'$ of the first work-piece 114 being much greater than then thickness $t_2'$ of the second work-piece 118. For example, the first work-piece 114 is at least twice as thick as the second work-piece 118, such that $t_1' \geq 2*t_2'$. In some examples, $t_1'$ is at least three times $t_2'$, and in some examples, is even at least four times $t_2'$.

Figures 3A, 3B, 3C, 3D:
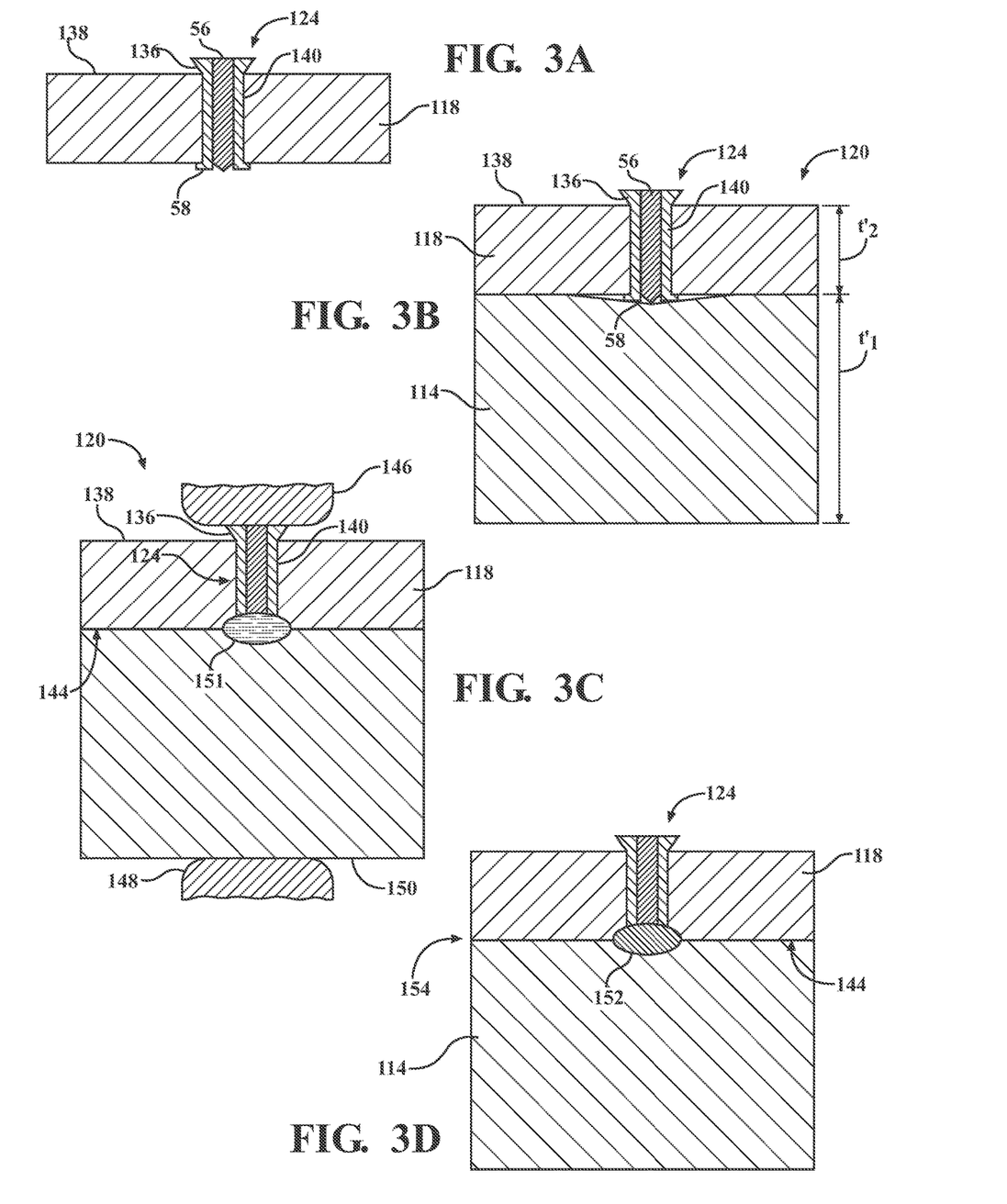
FIG. 3A is a schematic cross-sectional view of another example of a work-piece, the work-piece having a blind rivet inserted therethrough, according to the principles of the present disclosure.
FIG. 3B is a schematic cross-sectional view of a multiple work-piece stack-up including the work-piece and the rivet shown in FIG. 3A, with the rivet projecting into the adjacent work-piece in the stack-up, according to the principles of the present disclosure.
FIG. 3C is a schematic cross-sectional view of the multiple work-piece stack-up of FIG. 3B, having a pair of electrodes disposed on each side of the stack-up, and with a weld nugget beginning to form within the work-pieces, according to the principles of the present disclosure.
FIG. 3D is a schematic cross-sectional view of a bonded assembly formed by joining the stack-up of FIGS. 3B-3C, in accordance with the principles of the present disclosure.

To provide for a well-penetrated weld joint, the method 10 includes a step 22 of disposing a third material in contact with both the first and second steel work-pieces 114, 118. In the example of FIG. 3B, the third material is provided in the form of the blind rivet 124, which is inserted through the second steel work-piece 118 and contacting the first steel work-piece 114 to provide for greater heating in the second work-piece 118.

Referring now to FIG. 3C, a resistance spot welding operation is performed by pressing a first electrode 146 against the head 136 of the rivet 124 and a second electrode 148 against an outer side 150 of the first work-piece 114. A current is passed between the first and second electrodes 146, 148 through the rivet 124 and the first and second work-pieces 114, 118. As the current is passed through the rivet shank 140 and the work-pieces 114, 118, joule heat generation is enhanced at the faying interface 144 between the work-pieces 114, 118, which improves the weld penetration into the thinner steel work-piece 118. The heat generated by the electrodes 146, 148 begins to form a molten weld pool 151 at the faying interface 144.

Referring now to FIG. 3D, the electrodes 146, 148 have been removed, and the molten weld pool 151 has hardened into a balanced weld nugget 152 at the faying interface 144. The weld nugget 152 penetrates well into both of the work-pieces 114, 118. For example, the weld nugget 152 may penetrate into each of the first and second work-pieces 114, 118 by 25-75% of the total of the weld nugget 152. Thus, FIG. 3D illustrates a bonded assembly 154 that includes the first member 114, the second member 118, and the rivet 124 bonded together through the weld nugget 152.

Referring now to FIGS. 4A-4D, yet another example of the application of the method 10 of FIG. 1 is illustrated. In this example, a material is coated onto one of the work-pieces. In one variation, the material is thermally sprayed onto a first work-piece 214 to form a thermal spray coating 64 on the first work-piece 214. For example, a torch may be used to atomize the material into a powder that forms the coating 64 on the first work-piece 214. In the alternative, the coating 64 could be formed by another process, such as by hot dipping. A second work-piece 218 is disposed onto the first work-piece 214 with the coating 64 disposed between the two work-pieces 214, 218 to form a work-piece stack-up 220. Thus, the coating 64 is in contact with both work-pieces 214, 218. In the alternative to forming the coating 64 on solely the first work-piece 214, the coating 64 could also or alternatively be formed on the second work-piece 218.

All other details of the description and figures regarding the work-piece stack-ups 20, 120 of FIGS. 2A-2D and 3A-3D may apply to FIGS. 4A-4D. For example, the thicknesses $t_1''$, $t_2''$ of the first and second work-pieces 214, 218 vary substantially. Thus, the thicknesses $t_1''$, $t_2''$ of each of the respective work-pieces 214, 218 are different from one another, with the thickness $t_1''$ of the first work-piece 214 being much greater than then thickness $t_2''$ of the second work-piece 218. For example, the first work-piece 214 is at least twice as thick as the second work-piece 218, such that $t_1'' > 2*t_2''$. In some examples, $t_1''$ is at least three times $t_2''$, and in some examples, $t_1''$ is even at least four times $t_2''$. A thickness u of the coating 64 is less than the thicknesses $t_1''$, $t_2''$ of either work-piece 114, 118. For example, the coating thickness u may be one-fifth or less than the thickness $t_2''$ of the thinner work-piece 218.

Figure 4A:
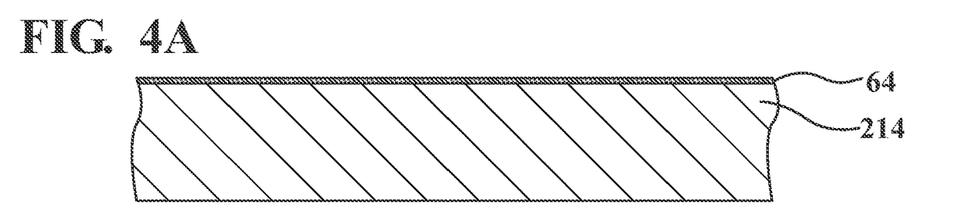
FIG. 4A is a schematic cross-sectional view of a work-piece having a thermal spray coating being disposed thereon, in accordance with the principles of the present disclosure.
Figure 4B:
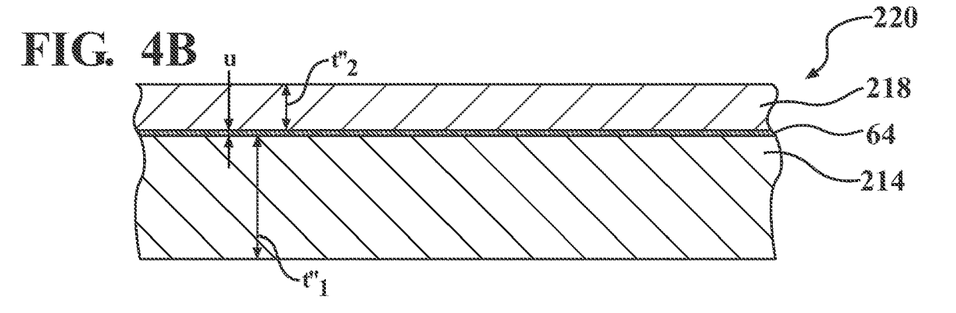
FIG. 4B is a schematic cross-sectional view of a multiple work-piece stack-up including the work-piece of FIG. 4A and another work-piece disposed thereon with the thermal spray coating disposed therebetween, according to the principles of the present disclosure.

To provide for a well-penetrated weld joint, the method 10 includes a step 22 of disposing a third material in contact with both the first and second steel work-pieces 214, 218. In the example of FIG. 4B, the third material is provided in the form of a coating 64 at the faying interface 244 to provide for greater heating in the second work-piece 118.

Figure 4C:
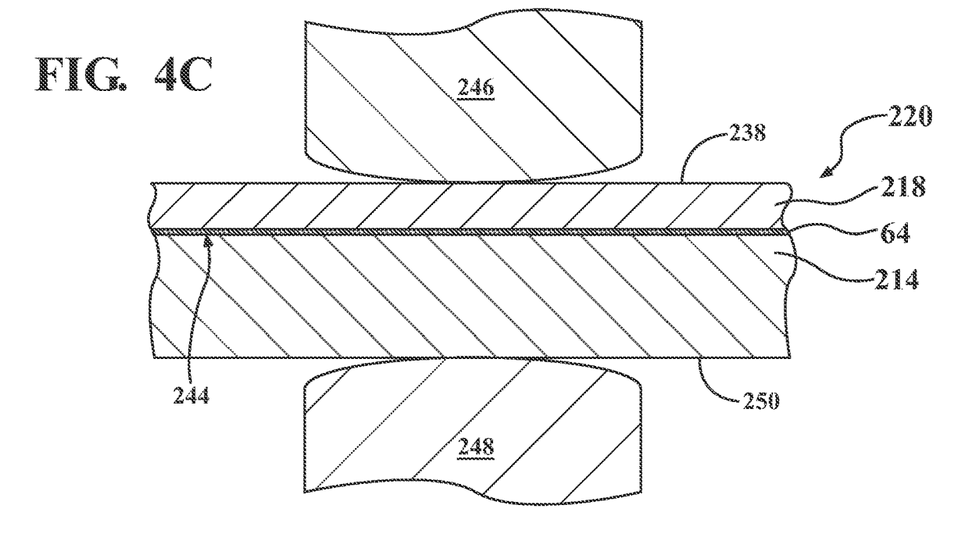
FIG. 4C is a schematic cross-sectional of view of the multiple work-piece stack-up of FIG. 4B, having a pair of electrodes disposed on each side of the stack-up, according to the principles of the present disclosure.

Referring now to FIG. 4C, a resistance spot welding operation is performed by pressing a first electrode 246 against an outer side 238 of the second work-piece 218 and a second electrode 248 against an outer side 250 of the first work-piece 214. A current is passed between the first and second electrodes 246, 248 through the first and second work-pieces 214, 218 and through the coating 64. As the current is passed through the coating 64 and the work-pieces 214, 218, the coating 64 enhances joule heat generation at the faying interface 244, which improves the weld penetration into the thinner steel work-piece 218.

Figure 4D:
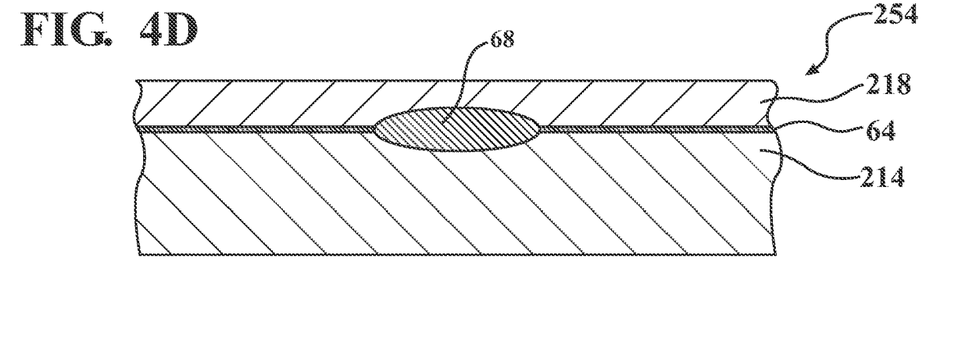
FIG. 4D is a schematic cross-sectional view of a bonded assembly formed by joining the stack-up of FIGS. 4B-4C, in accordance with the principles of the present disclosure.

Referring now to FIG. 4D, a balanced weld nugget 68 is therefore formed at the faying interface 244 between the first and second steel work-pieces 214, 218, where the weld nugget 68 penetrates well into both of the first and second work-pieces 214, 218. For example, the weld nugget 68 may penetrate into each of the first and second work-pieces 214, 218 by 25-75% of the total of the weld nugget 68. Thus, FIG. 4D illustrates a bonded assembly 254 that includes the first member 214, the second member 218, and the coating 64 bonded together through the weld nugget 68.

The coating 64 is preferably formed of a high resistivity material. In some examples, the coating 64 could be formed of a boron steel alloy (such as PHS1300), a GEN 3 steel, a multi-phase steel (such as MP1180 or MP980), a dual-phase steel (such as DP980, DP780, or DP590), or a high-strength low alloy steel (such as 340HSLA). The coating 64 could alternatively be formed of nickel or an aluminum-silicon alloy, or an adhesive material. In some examples, the coating 64 could be formed of combinations of these materials, such as an adhesive containing steel, nickel, and/or an aluminum-silicon alloy.

Referring now to FIGS. 5A-5D, yet another example of an application of the method 10 of FIG. 1 is illustrated. In this example, a plurality of projections or pins 74 are disposed onto the first work-piece 314 (and/or the second work-piece 318). For example, an arc welding torch 75 may be used in a cold metal transfer process to form the pins 74 onto an inner surface 76 of the first work-piece 314. In the alternative, the pins 74 could be added by another process. A second work-piece 318 is disposed onto the first work-piece 314 with the pins 74 disposed between the two work-pieces 314, 318 to form a work-piece stack-up 320. Thus, the pins 74 are in contact with both work-pieces 314, 318.

All other details of the description and figures regarding the work-piece stack-ups 20, 120, 220 of FIGS. 2A-2D, 3A-3D, and 4A-4D may apply to FIGS. 5A-5D. For example, the thicknesses $t_1'''$, $t_2'''$ of the first and second work-pieces 314, 318 vary substantially. Thus, the thicknesses $t_1'''$, $t_2'''$ of each of the respective work-pieces 314, 318 are different from one another, with the thickness $t_1'''$ of the first work-piece 314 being much greater than then thickness $t_2'''$ of the second work-piece 318. For example, the first work-piece 314 is at least twice as thick as the second work-piece 318, such that $t_1''' \geq 2*t_2'''$. In some examples, $t_1'''$ is at least three times $t_2'''$, and in some examples, $t_1'''$ is even at least four times $t_2'''$.

To provide for a well-penetrated weld joint, the method 10 includes a step 22 of disposing a third material in contact with both the first and second steel work-pieces 314, 318. In the example of FIGS. 5A-5D, the third material is provided in the form of a plurality of pins 74 at the faying interface 344 to provide for greater heating in the second work-piece 318.

Figure 5A:
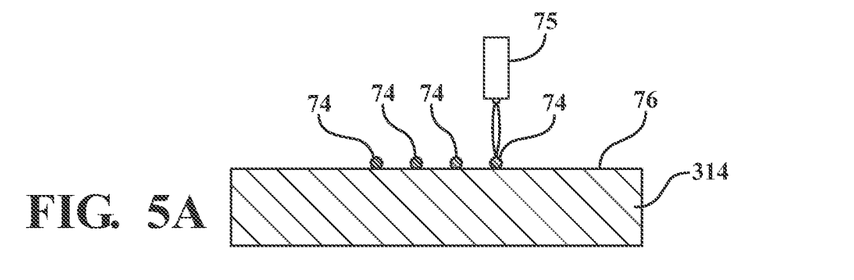
FIG. 5A is a schematic cross-sectional view of a work-piece having a plurality of pins being disposed thereon, in accordance with the principles of the present disclosure.
Figure 5B:
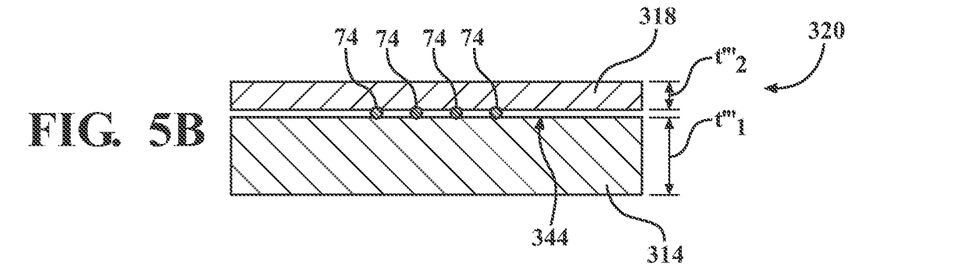
FIG. 5B is a schematic cross-sectional view of a multiple work-piece stack-up including the work-piece of FIG. 5A and another work-piece disposed thereon with the plurality of pins disposed therebetween, according to the principles of the present disclosure.
Figure 5C:
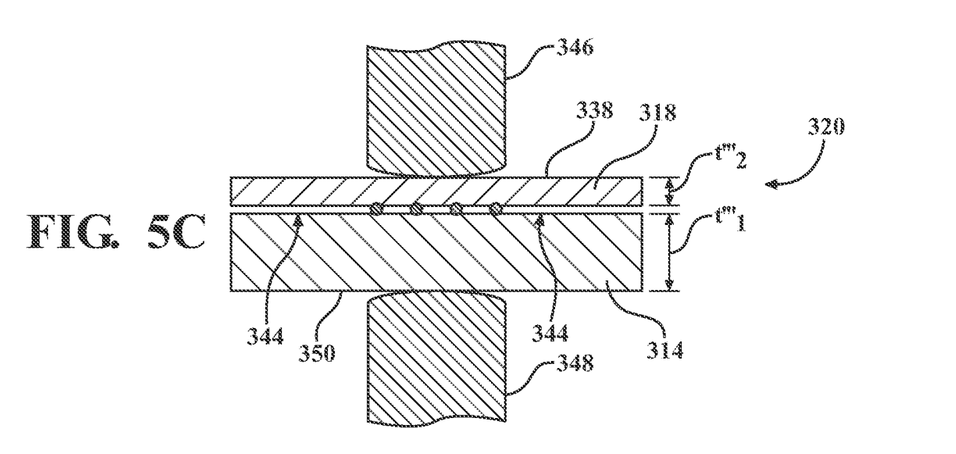
FIG. 5C is a schematic cross-sectional of view of the multiple work-piece stack-up of FIG. 5B, having a pair of electrodes disposed on each side of the stack-up, according to the principles of the present disclosure.

Referring now to FIG. 5C, a resistance spot welding operation is performed by pressing a first electrode 346 against an outer side 338 of the second work-piece 318 and a second electrode 348 against an outer side 350 of the first work-piece 314. A current is passed between the first and second electrodes 346, 348 through the first and second work-pieces 314, 318 and through the pins 74. As the current is passed through the pins 74 and the work-pieces 314, 318, the pins 74 enhance joule heat generation at the faying interface 344, which improves the weld penetration into the thinner steel work-piece 318.

Figure 5D:
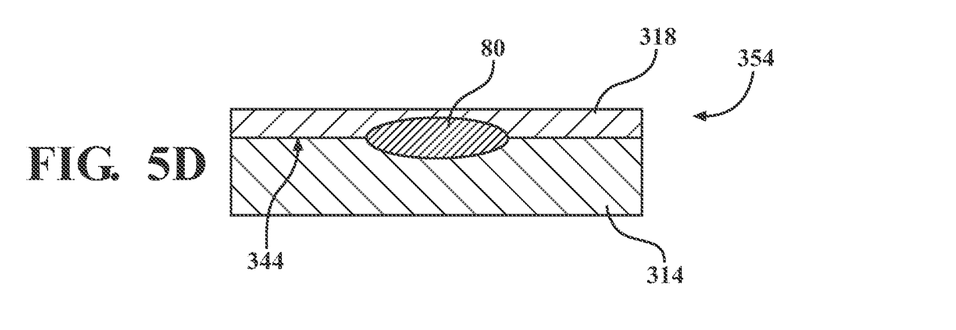
FIG. 5D is a schematic cross-sectional view of a bonded assembly formed by joining the stack-up of FIGS. 5B-5C, in accordance with the principles of the present disclosure.

Referring now to FIG. 5D, a balanced weld nugget 80 is therefore formed at the faying interface 344 between the first and second steel work-pieces 314, 318, where the weld nugget 80 penetrates well into both of the first and second work-pieces 314, 318. For example, the weld nugget 80 may penetrate into each of the first and second work-pieces 314, 318 by 25-75% of the total of the weld nugget 80. Thus, FIG. 5D illustrates a bonded assembly 354 that includes the first member 314, the second member 318, and the pins 74 bonded together through the weld nugget 80. After the spot-welding operation, the pins 74 may be substantially or fully subsumed within the weld nugget 80, as shown in FIG. 5D.

The pins 74 may be formed of, for example CMT (cold metal transfer) print or CMT pins. The pins 74 may be formed of a steel material, for example, ER70S-3 or ER70S-6 steels, by way of example. An ER70S-3 steel may contain: 0.06-0.15 weight percent carbon; 0.90-1.40 weight percent manganese; 0.45-0.75 weight percent silicon; a maximum of 0.025 weight percent phosphorus; a maximum of 0.035 weight percent sulfur; a maximum of 0.15 weight percent nickel; a maximum of 0.15 weight percent chromium; a maximum of 0.15 weight percent molybdenum; a maximum of 0.03 weight percent vanadium; a maximum of 0.50 weight percent copper; and the balance iron. An ER70S-6 steel may contain: 0.06-0.15 weight percent carbon; 1.40-1.85 weight percent manganese; 0.80-1.15 weight percent silicon; a maximum of 0.025 weight percent phosphorus; a maximum of 0.035 weight percent sulfur; a maximum of 0.15 weight percent nickel; a maximum of 0.15 weight percent chromium; a maximum of 0.15 weight percent molybdenum; a maximum of 0.03 weight percent vanadium; a maximum of 0.50 weight percent copper; and the balance iron.

Though the multiple work-piece stack-ups 20, 120, 220, 320 illustrated herein include two work-pieces, additional work-pieces could be included in the stack-ups 20, 120, 220, 320 without falling beyond the spirit and scope of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of joining a multiple member work-piece, the method comprising:
   providing a steel first work-piece having a first thickness;
   providing a steel second work-piece having a second thickness, the first thickness being at least twice the second thickness;
   piercing a rivet into the second work-piece to create a bulge in the steel second work-piece that is extended from the second workpiece at a faying interface between the first and second work-pieces;
   compressing the steel first work-piece and the rivet onto the steel second work-piece, wherein the bulge creates a gap between the steel first work-piece and the steel second work-piece; and
   resistance welding the first and second work-pieces and the rivet together to form a weld nugget within the gap at the faying interface.

2. The method of claim 1, further comprising providing the first thickness as being at least three times the second thickness.

3. The method of claim 1, the first and second work-pieces being formed of the same material.

4. The method of claim 1, further comprising providing the rivet having a head and disposing the head on an outer side of the second work-piece, wherein the step of resistance welding includes pressing a first electrode against the head of the rivet and a second electrode against an outer side of the first work-piece and passing a current between the first and second electrodes through the first and second work-pieces and through the rivet.

5. The method of claim 4, further comprising providing the head having a third thickness, the third thickness being less than twice the second thickness, and the third thickness being greater than one-fifth the second thickness.

6. The method of claim 4, further comprising piercing the rivet completely through the second work-piece and into the first work-piece.

* * * * *